United States Patent [19]

Beckett

[11] Patent Number: 5,213,902

[45] Date of Patent: May 25, 1993

[54] MICROWAVE OVEN PACKAGE

[75] Inventor: D. Gregory Beckett, Oakville, Canada

[73] Assignee: Beckett Industries Inc., Oakville, Canada

[21] Appl. No.: 656,736

[22] Filed: Feb. 19, 1991

[51] Int. Cl.⁵ .................................................. B32B 3/10
[52] U.S. Cl. ..................................... 428/597; 428/596; 426/107
[58] Field of Search ................. 426/107, 243; 428/596, 428/597

[56] References Cited

U.S. PATENT DOCUMENTS 4,398,994  8/1983  Beckett .............................. 156/659.1
4,552,614  11/1985  Beckett ................................. 156/640
4,927,991  5/1990  Wendt et al. ..................... 219/10.55 E Primary Examiner—Michael Lewis
Assistant Examiner—Valerie Lund
Attorney, Agent, or Firm—Sim & McBurney

[57] ABSTRACT

A laminate structure useful for incorporating into a package structure for the microwave cooking of foodstuffs for consumption comprises an outer layer polymeric material, an outer layer of microwave transparent material, a grid layer having an electroconductive surface surrounding transmissive apertures located between the outer layers, and a thin layer of electroconductive material of sufficient thickness so that a portion of incident microwave energy is converted to thermal energy also located between the outer layers. The structure is useful in providing controlled surface heating and microwave transmittance to achieve a more uniformly heated product employing 13 Claims, 4 Drawing Sheets

MICROWAVE OVEN PACKAGE

FIELD OF INVENTION

The present invention relates to a novel form of microwave oven package which combines a microwave susceptor and a microwave-reflective grid.

BACKGROUND TO THE INVENTION

In U.S. Pat. No. 4,927,991 (Wendt), assigned to The Pillsbury Company, the disclosure of which is incorporated herein by reference, there is described a novel form of food package for a microwave oven which has a microwave-reflective grid in combination with a microwave susceptor. This combination provides a useful arrangement in the microwave cooking of foodstuffs for consumption, by controlling surface heating and microwave transmittance to the foodstuff to achieve a more uniformly heated product.

However, in each of the embodiments described in U.S. Pat. No. 4,927,991, the microwave susceptor, that is, the element of the structure which generates thermal energy when exposed to microwave radiation, takes the form of a thin metal film, usually aluminum, supported on a polymeric substrate layer.

When the arrangement of susceptor and grid is incorporated into a packaging structure in this prior art, multiple layers are required, typically the susceptor-polymeric film combination adhesively bonded by laminating adhesive to a paper or paperboard layer, which usually forms part of the package, the grid, usually formed of aluminum foil, adhesively bonded by laminating adhesive to the susceptor-polymeric film combination on the opposite side from the paper or paperboard layer, and a polymeric film layer adhesively bonded by laminating adhesive to the grid to avoid the foodstuff contacting the grid directly.

SUMMARY OF INVENTION

In accordance with the present invention, this prior art combination of microwave-reflective grid and microwave susceptor is considerably enhanced by providing an arrangement which is practical but requires fewer layers of structural material in the laminate and hence much less material of construction.

Accordingly, in one aspect, the present invention provides a laminate structure, useful for forming a food package for a microwave oven, consisting essentially of four structural elements comprising an outer polymeric film layer, an outer substrate layer of microwave transparent material, a layer of material defining a grid located between said outer layers, the grid having an electroconductive surface surrounding transmissive apertures, and a thin layer of electroconductive material located between the outer layers, the thin layers being of sufficient thickness that a portion of incident microwave energy is converted to thermal energy.

In one embodiment of this aspect of the present invention, there is provided a multiple layer laminate which is useful for forming a food package for a microwave oven, which comprises a polymeric film layer; a layer of material adhered to the polymeric film layer and defining a grid, the grid having an electroconductive surface and surrounding transmissive apertures; a thin layer of electroconductive material of sufficient thickness that a portion of incident microwave energy is converted to thermal energy, the electroconductive material overlaying the grid layer and adhered to the electroconductive surface and to the polymeric film layer in the apertures; and a substrate layer of microwave transparent material adhered to the electroconductive material layer.

In another embodiment of this aspect of the invention, there is provided a laminate structure, useful for forming a food package for a microwave oven, which comprises a polymeric material layer, a thin layer of electroconductive material of sufficient thickness that a portion of incident microwave energy is converted to thermal energy, the thin layer of electroconductive material being adhered to the polymeric material layer, a layer of material adhered to the thin layer of electroconductive material and defining a grid, the grid having an electroconductive surface surrounding transmissive apertures, and a substrate layer of microwave transparent material adhered to the grid.

In these novel laminate arrangements, a considerable economy of structural materials is achieved, as compared to the prior art structure of U.S. Pat. No. 4,927,991, which requires a minimum of five structural layers in the laminate.

The ability to provide useful structures with a minimum of structural elements arises from the manner of formation of the laminate structure. The procedures utilized constitute a further aspect of this invention.

The present invention, in one embodiment of this aspect thereof, relates to a method of forming a laminate structure useful for forming a food package for a microwave oven, which comprises forming a first laminate comprising a layer of material defining a grid having an electroconductive surface surrounding transmissive apertures adhered to a polymeric film layer; directly depositing a thin layer of electroconductive material over the grid layer to adhere to the electroconductive surface and to the polymeric film layer in the apertures, the thin electroconductive material layer having a thickness sufficient to convert a portion of incident microwave energy to thermal energy; and adhering the thin electroconductive material layer to a substrate layer of microwave transparent material.

By directly depositing the thin layer of electroconductive material over the grid layer, the necessity for providing the susceptor layer supported by a polymeric film layer, as in the prior art U.S. Pat. No. 4,927,991, is avoided.

In another embodiment of this aspect of the invention, there is provided a method of forming a laminate structure useful for forming a food package for a microwave oven, which comprises forming a first laminate comprising a layer of material defining a grid having an electroconductive surface surrounding transmissive apertures adhered to a thin layer of electroconductive material supported on a polymeric film layer, the thin electroconductive material layer having a thickness sufficient to convert a portion of incident microwave energy to thermal energy, and adhering the grid layer to a substrate layer of microwave transparent material.

DESCRIPTION OF PREFERRED EMBODIMENT

Figure 1A:
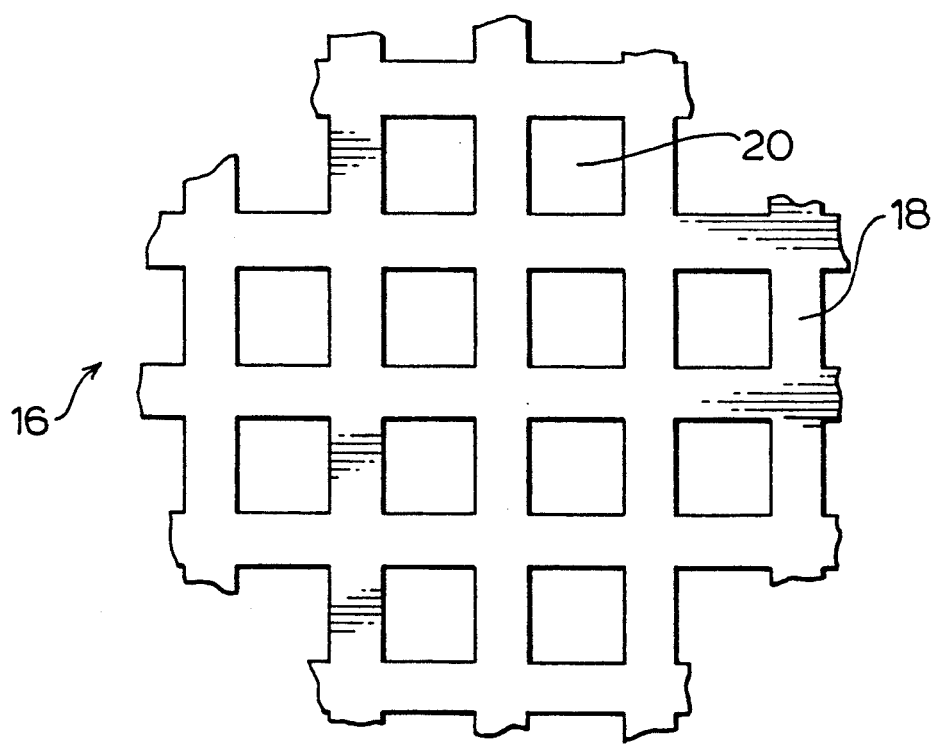
FIG. 1A is a plan close-up view of a portion of the grid structure of the laminate of FIG. 1.
Figure 1:
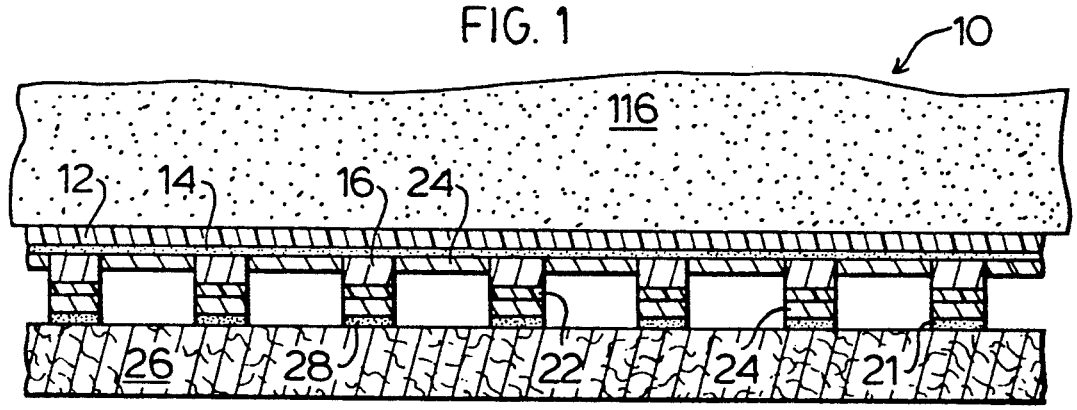
FIG. 1 is a sectional view of a laminate structure provided in accordance with one embodiment of the invention.

Referring first to FIG. 1, there is shown therein a multi-layer laminate structure 10 provided in accordance with one embodiment of the invention. The laminate structure 10 comprises a first polymeric film layer 12 which is intended to engage the foodstuff to be cooked by microwave energy.

Adhered to the polymeric film layer 12 through a layer 14 of adhesive material is a grid layer 16 comprising a conductive surface 18 surrounding transmissive apertures 20 (see FIG. 1A). The conductive surface 18 in the form of interconnected metal strips defines a microwave opaque area of the grid layer 16 and the ratio of microwave opaque area to the open area of the apertures 20 may vary widely, depending upon the effects desired. The grid layer 16 is formed from any convenient electroconductive material which is microwave reflective. Conveniently, the grid layer 16 is formed from aluminum foil, generally of thickness about 1 to about 15 microns in thickness, preferably about 3 to about 10 microns, typically about 7 to 8 microns.

Figure 3:
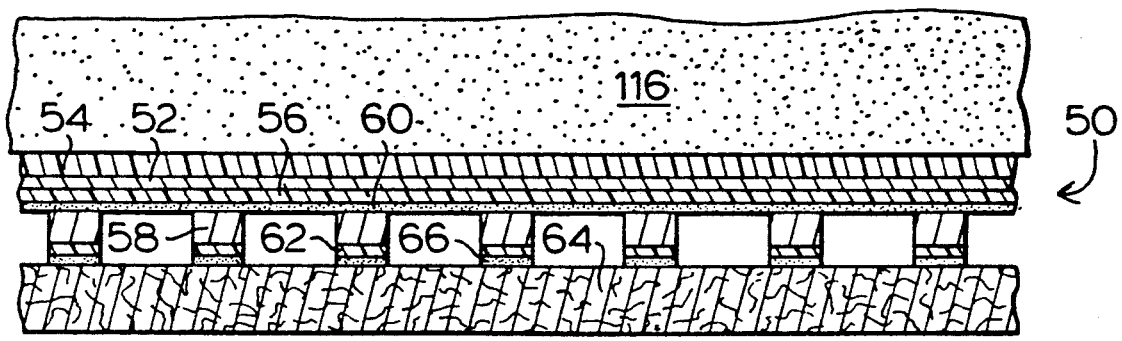
FIG. 3 is a sectional view of a laminate structure provided in accordance with another embodiment of the invention.

Overlaying the grid layer 16 is a layer 22 of lacquer, remaining from demetallizing the foil to form the grid 16. A thin metal layer 24 of microwave susceptor thickness, such that a portion of incident microwave energy may be converted into thermal energy, overlies the grid layer 16. The thin metal layer 24 overlies and is adhered to the lacquer 22 in the region of the conductive surface 18 and, in the apertures 20, is adhered to the adhesive layer 14 overlying the polymeric film layer 12. The thin metal layer 24 usually is provided by aluminum or other electroconductive metal or material, and is very thin compared to the grid layer 16 (FIGS. 1 and 3 are not to scale with respect to the relative thicknesses of the layers in the laminate for ease of illustration), so that a portion of incident microwave energy is converted to thermal energy. For aluminum, the thickness may vary corresponding to an optical density (O.D.) of from about 0.08 to about 1.0 preferably about 0.1 to about 0.4 O.D.

The laminate is completed by a substrate layer 26 of paper or paperboard, or other convenient microwave-transparent dielectric material, adhered to the thin metal layer 24 through a layer 28 of adhesive material.

As described in the aforementioned U.S. Pat. No. 4,927,991, the grid layer 16 controls the microwave transmission of the combination of grid layer 16 and thin metal susceptor layer 24. When microwave energy impinges on the grid layer 16 and susceptor layer 24, some of the microwave energy is transmitted through the grid layer 16 and the susceptor layer 24, some of the microwave energy is absorbed by the susceptor layer 24 and converted into thermal energy, and some of the microwave energy is reflected mainly by the electroconductive surface 18 and, to a minor degree, by the susceptor layer 24.

The relative proportions of the microwave energy which is transmitted, converted and reflected is controlled mainly by controlling the dimensions and shape of the apertures 20 in the grid layer 16 and, to a lesser extent, by the thickness of the thin material susceptor layer 24.

The grid layer 16 also serves the function of achieving a more uniform heating of a foodstuff engaging or at least in close proximity to the laminate. As described in the U.S. Pat. No. 4,927,991, the grid layer 16 tends to spread the heating effects of the microwave radiation to achieve a more uniform heating by the susceptor layer 24.

The grid layer 16 is illustrated in FIG. 1A as comprising a uniform square pattern of square transmissive apertures 20. The geometry of the openings may be varied as desired and such variation may lead to modified performance. As set forth in the aforementioned U.S. Pat. No. 4,927,991, a variety of shapes and arrangements may be provided, including square openings in a square lattice (as illustrated), square openings in an equilateral triangle lattice, round openings in a square lattice and round openings in an equilateral triangle lattice. A variety of shapes and geometries is shown in FIGS. 38 and 39 of U.S. Pat. No. 4,927,991 and may be employed herein.

The size of the apertures 20 may be varied. Generally, increasing the size of the aperture generally increases the percentage of the microwave power which is absorbed by the thin metal susceptor and generally increases the percentage of the microwave power which is transmitted through the combination of grid layer 16 and susceptor layer 24. It is preferred for the apertures to be dimensioned from about 0.125 inch to about 2 inches, more preferably from about 0.375 to about 0.875 inch. If the aperture is made too small, the amount of absorption of energy by the susceptor layer 24 becomes insufficient while, if the aperture is made too large, the advantages of the invention with respect to uniformity of heating and control of reflectance diminish.

These dimensions refer, in the case of a square opening to its width, in the case of a circular opening to its diameter, in the case of a rectangular opening to the average of its length and width and in the case of other shapes to the length of the major axis.

Figure 2:
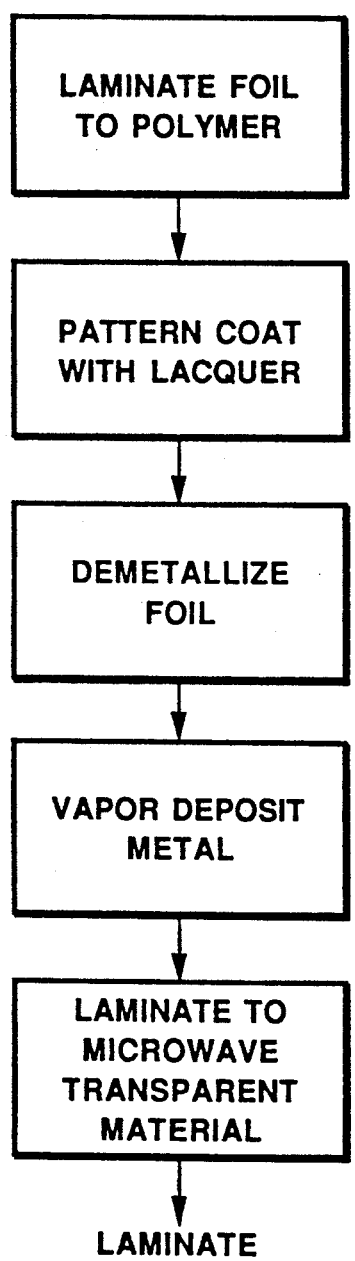
FIG. 2 is a schematic flow sheet of a procedure for forming the laminate of FIG. 1.

The improved structure of laminate 10 arises from its manner of assembly, which now is described with reference to FIG. 2. The first step is to laminate aluminum foil to the polymeric film layer 12, such as by employing laminating adhesive, or by vapor deposition of aluminum of the desired thickness on the polymer sheet.

The aluminum foil then is subjected to selective demetallization to remove aluminum from the areas of the foil required to provide the apertures 20 while leaving untouched aluminum in the areas of the foil required to provide the electroconductive surface regions 18 of the grid layer 16.

Such selective demetallization may be effected by any convenient procedure but, preferably, a chemical etching procedure is employed, such as one of the procedures described in U.S. Pat. Nos. 4,398,994 and 4,552,614, the disclosures of which are incorporated herein by reference. In such procedures, a pattern of protective lacquer first is applied to the metal. Another possible procedure involves the use of ultrasound to effect such demetallization.

Alternatively, the selective demetallization of the aluminum foil may be effected prior to adhesion by lamination to the polymeric film layer, for example, by stamping out of the apertures, or by applying an etchant-resistant material in the desired pattern to both surfaces of the aluminum foil and then passing the foil through an etchant bath to remove aluminum from the regions not protected by the etchant-resistant material.

Once the grid layer 16 is formed adhered to the polymeric film layer 12, a continuous thin aluminum metal layer 24 is formed over the grid layer 16 by vapor deposition. The thin metal layer may be formed in any other convenient manner from any other convenient metal, such as a thin layer of stainless steel by sputtering. Such deposition forms a continuous thin film of thickness which permits incident microwave energy to be partially converted to thermal energy.

The thin metal layer 24 overlies and adheres to the areas of the grid layer 16 occupied by the electroconductive surface regions 18, while, in the apertures 20 of the grid layer, the thin metal layer is adhered directly to the adhesive overlying the polymeric film layer 12.

The exposed side of the thin metal layer 16 then is laminated with suitable laminating adhesive to the paper or paperboard layer 26 or other microwave transparent material to complete the laminate 10.

Referring now to FIG. 3, there is illustrated therein an alternative form of laminate structure 50 provided in accordance with a second embodiment of the invention. In this embodiment, use is made of metallized polymeric film, as in the aforementioned U.S. Pat. No. 4,927,991, but in a more efficient manner.

In the laminate 50, a thin metal layer 52 of susceptor thickness is carried on a polymeric film layer 54 and has a layer 56 of etchant-resistant lacquer therein. A foil grid 58 is adhered by adhesive layer 60 to the lacquer layer 56. The lacquer layer 56 may be omitted if the adhesive layer 60 is sufficiently resistant to etchant material to prevent penetration to the thin metal layer 52.

A further layer 62 of etchant-resistant material overlies the foil grid 58. An outer layer 64 of microwave transparent material is adhered to the etchant-resistant material layer 62 by an adhesive layer 66.

Figure 4:
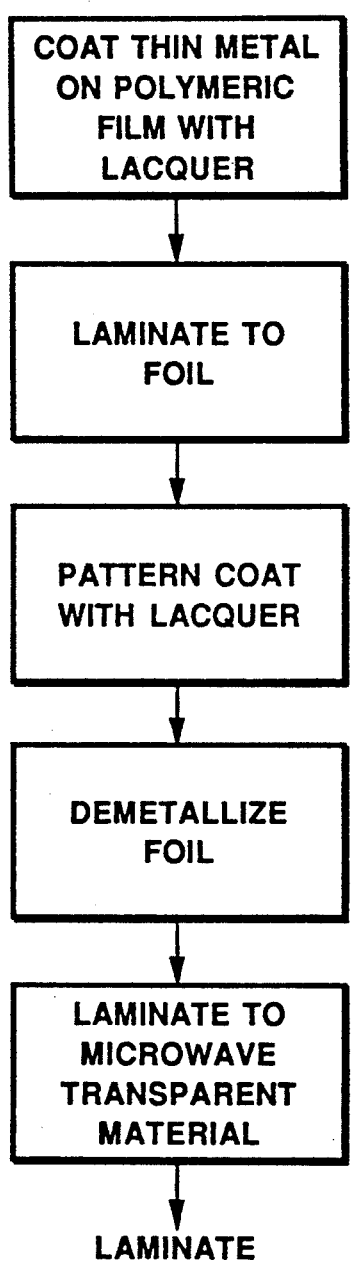
FIG. 4 is a schematic flow sheet of a procedure for forming the laminate of FIG. 3.

A procedure for forming the novel laminate structure 50 of FIG. 3 is shown schematically in FIG. 4. A metallized polymeric material layer is coated on the metal side with a layer of etchantresistant material. This structure then is laminated to aluminum foil.

The exposed surface of the aluminum foil is coated with a pattern of etchant-resistant material corresponding to the desired structure of grid 58. Etchant then is applied to effect selective demetallization of the aluminum foil to form the grid 58.

The etched structure then is laminated to the layer 64 of microwave-transparent material, such as paperboard, to provide the finished laminate structure 50.

Figure 5B:
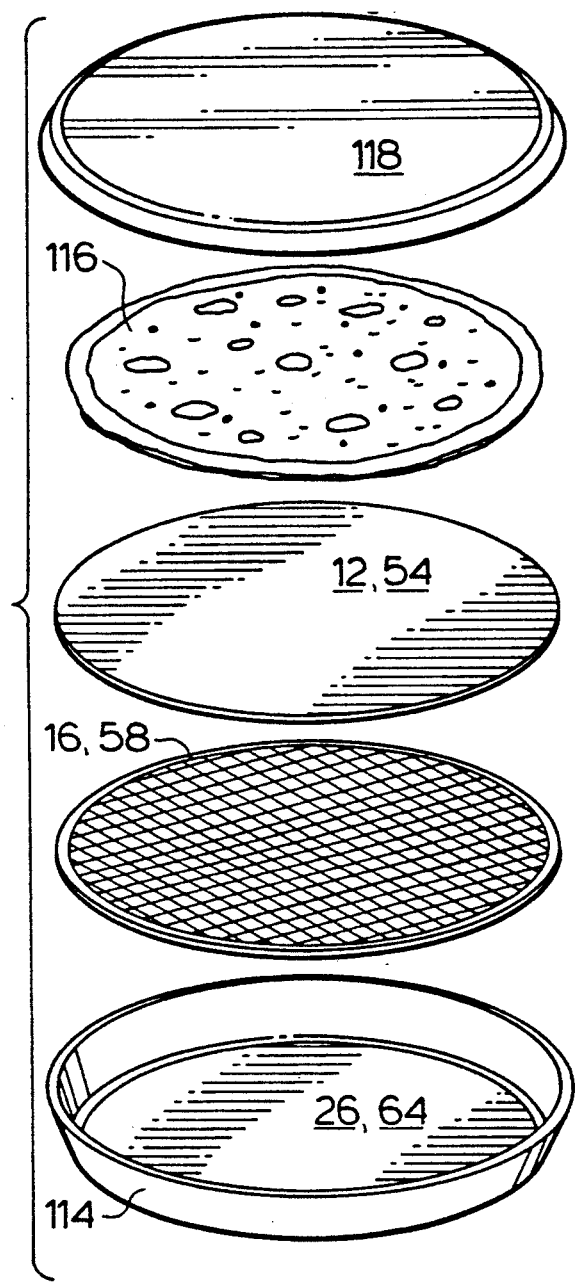
FIGS. 5A and 5B are a sectional and an exploded perspective view respectively of a pizza box incorporating the laminate structure of FIG. 1 or 3.
Figure 5A:
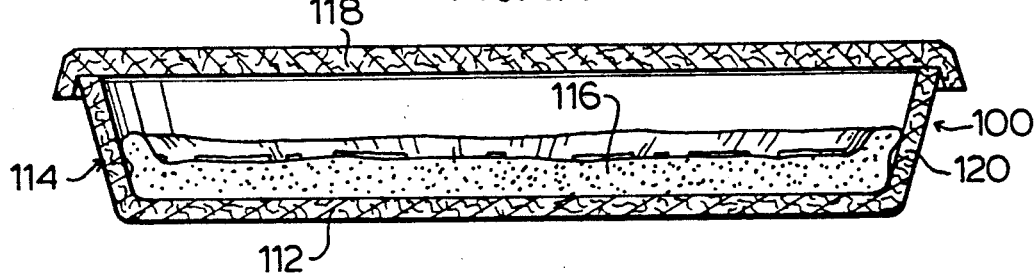

The laminate structures 10 and 50 may be incorporated into a foodstuff packaging structure for heating by microwave energy for consumption. One such foodstuff package structure is a pizza box 100 (FIGS. 5A, 5B) in which the laminate 10 is incorporated into the bottom wall 112, with the substrate layer 26 or 64 being paperboard and forming part of the material of the construction of the tray portion 114 of pizza box 100. Alternatively, the laminates 10 or 50 may be provided as a separate element resting on the bottom wall 112 of the tray 114.

A frozen pizza 116 is supported on the polymeric film layer 12 of the laminate structure. It is noted that U.S. Pat. No. 4,927,991 makes no mention of a polymeric film layer overlying the grid layer in the illustrated structures. However, such a layer is necessary to avoid contamination of the foodstuff by the metal. The pizza box 100 is closed by a lid 118, which may be vented and/or shielded as desired, as described in U.S. Pat. No. 4,927,991, so as to achieve improved uniformity of heating.

When the pizza 116 is exposed to microwave radiation, the heating effect of the susceptor layer 24 is substantially uniform as a result of the combination of a susceptor 24 with the grid layer 16. The hot cooking surface (described as a "frying pan effect" in U.S. Pat. No. 4,927,991) serves to uniformly brown and crispen the crust of the pizza 116. The pizza topping or filling and the crust of the pizza also are cooked by a combination of heat emitted by the susceptor layer 24 and dielectric heating of the pizza 116, due to the microwave radiation which enters the tray through the lid 118 and the microwave transparent side wall 120 of the tray 114, as well as through the bottom wall 112. The combination of the "frying pan" effect, and the dielectric heating of the food by transmitted microwave energy, significantly decreases the total cooking time for the pizza 116, when compared to a conventional oven. The improved laminate structure 10 or 50 not only uses significantly less material than that described in U.S. Pat. No. 4,927,991, but also further decreases the cooking time, as outlined below. The resultant cooked pizza 116 possesses desirable characteristic of moistness and degree of cooking, together with a substantially uniformly browned and crispened crust.

The laminate structures 10 and 50 may be formed in continuous sheets, from which individual items are removed for use in the appropriate packaging, or the laminate 10 or 50 may be formed as part of the packaging structure incorporating the laminate, whichever is more convenient for the particular microwave package and foodstuff to be packaged therein.

Both of the laminate structures 10 and 50 comprise outer layers of polymeric material and microwave-transparent material and a thin metal layer and a grid structure sandwiched therebetween. These structures employ one less structural element than the structures of the prior art.

Figure 6:
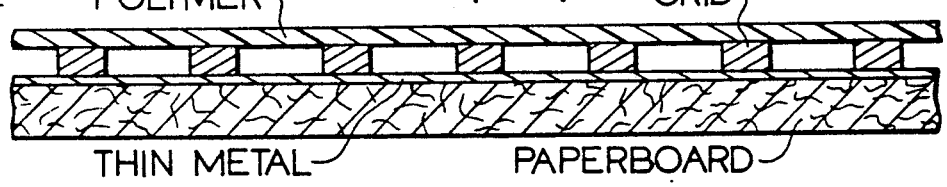
FIG. 6A-C compares the structural layers of the laminates of FIGS. 1 and 3 with those of a laminate constructed as described in U.S. Pat. No. 4,927,991.
Figure 6:
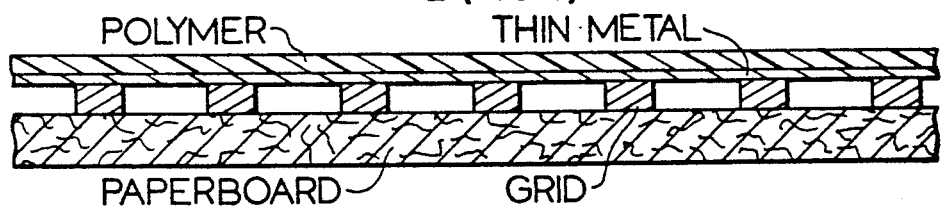
Figure 6:
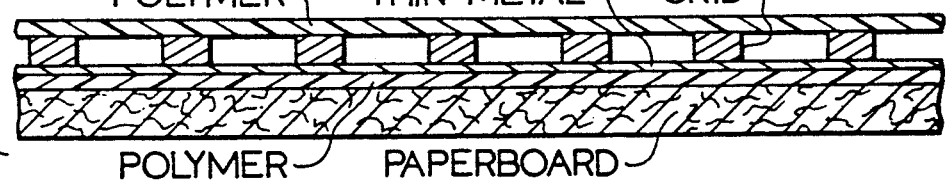

In FIG. 6, there is compared the structural elements of laminate 10 (A) and laminate 50 (B) with a typical structure (C) described in U.S. Pat. No. 4,927,991 (see FIG. 4B of that patent). As noted earlier, the structures described in the prior art have an exposed metal grid. For health reasons, it is essential that the grid be covered with a layer of polymeric material, which becomes the additional structural layer in the prior art.

SUMMARY OF DISCLOSURE

In summary of this disclosure, the present invention provides novel laminate structures for achieving even heating of foodstuffs by exposure to microwave energy, which is able to achieve such result with less material than the prior art, as well as a novel methods of producing such laminate structures. Modifications are possible within the scope of this invention.

What I claim is:

1. A laminate structure, useful for forming a food package for a microwave oven, which comprises:
   a polymeric film layer,
   a layer of material adhered to the polymeric film layer and defining a grid, the grid having an electroconductive surface surrounding transmissive apertures,
   a thin layer of electroconductive material of sufficient thickness that a portion of incident microwave energy is converted to thermal energy, said thin layer of electroconductive material overlaying said grid layer and being in abutting contact with and directly adhered to said electroconductive surface and to said polymeric film layer in said apertures, and
   a substrate layer of microwave transparent material adhered to the electroconductive material layer.

2. The structure of claim 1, wherein said microwave transparent material is paper or paperboard.

3. The structure of claim 1, wherein said microwave transparent material is polymeric material.

4. The structure of claim 1, wherein said layer of material defining the grid is formed of aluminum foil.

5. The structure of claim 4 wherein said aluminum foil has a thickness of about 1 to about 15 microns.

6. The structure of claim 5 wherein said thin layer of electroconductive material is formed of aluminum having a thickness corresponding to an optical density of about 0.1 to about 0.4.

7. The structure of claim 5 wherein said aluminum foil has a thickness of about 3 to about 10 microns.

8. The structure of claim 4 wherein said thin layer of electroconductive material is formed of aluminum.

9. The structure of claim 8 wherein said aluminum layer has a thickness corresponding to an optical density of about 0.08 to about 1.0.

10. The structure of claim 4 wherein said transmissive apertures each has a square outline.

11. The structure of claim 10 wherein said apertures have a width of about 0.125 to about 2 inches.

12. The structure of claim 11 wherein said width is about 0.375 to about 0.875 inch.

13. A laminate structure, useful for forming a food package for a microwave oven, which comprises:
    a polymeric film layer,
    a layer of material adhered to the polymeric film layer and defining a grid, the grid having an electroconductive surface surrounding transmissive apertures,
    said electroconductive surface of said grid having a layer of etchant-resistant material thereon,
    a thin layer of electroconductive material of sufficient thickness that a portion of incident microwave energy is converted to thermal energy, said thin layer of electroconductive material overlying said grid layer and being adhered to said etchant-resistant material on said electroconductive surface and to said polymeric film in said apertures, and
    a substrate layer of microwave transparent material adhered to the electroconductive material layer.

* * * * *